(12) United States Patent
Everingham et al.

(10) Patent No.: US 7,143,993 B2
(45) Date of Patent: Dec. 5, 2006

(54) EXHAUST GAS RECIRCULATION VALVE HAVING A ROTARY MOTOR

(75) Inventors: Gary Michael Everingham, Chatham (CA); Kirk Ivens, Chatham (CA)

(73) Assignee: Siemens VDO Automotive, Inc., Chatham (CA)

( * ) Notice: Subject to any disclaimer, the term of this patent is extended or adjusted under 35 U.S.C. 154(b) by 226 days.

(21) Appl. No.: 10/759,230

(22) Filed: Jan. 20, 2004

(65) Prior Publication Data
US 2005/0001185 A1  Jan. 6, 2005

Related U.S. Application Data

(60) Provisional application No. 60/440,857, filed on Jan. 17, 2003.

(51) Int. Cl.
*F16K 31/02* (2006.01)
(52) U.S. Cl. ................ 251/129.11; 251/77; 123/568.24
(58) Field of Classification Search ................. 251/77, 251/129.11, 129.19; 123/568.23, 568.24
See application file for complete search history.

(56) References Cited

U.S. PATENT DOCUMENTS

| 5,184,593 | A | * | 2/1993 | Kobayashi | 123/568.24 |
| 5,381,765 | A | * | 1/1995 | Rhodes | 123/90.67 |
| 5,680,880 | A | * | 10/1997 | Miyake et al. | 137/338 |
| 5,941,500 | A | * | 8/1999 | Lebkuchner | 251/77 |
| 6,224,034 | B1 | * | 5/2001 | Kato et al. | 251/164 |
| 6,484,704 | B1 | * | 11/2002 | Cook et al. | 123/568.16 |

OTHER PUBLICATIONS

U.S. Appl. No. 10/759,231, filed Jan. 20, 2004, Everingham et al., Exhaust Gas Recirculation Valve Having a Rotary Motor.
U.S. Appl. No. 10/759,229, filed Jan. 20, 2004, Everingham et al., Exhaust Gas Recirculation Valve Having a Rotary Motor.

* cited by examiner

*Primary Examiner*—Edward K. Look
*Assistant Examiner*—John K. Fristoe, Jr.

(57) ABSTRACT

An exhaust gas recirculation valve is provided. The exhaust gas recirculation valve has a base, a spring biasing the valve closed, and an actuator including a rotary motor and a linearly displaceable shaft that is coupled to the motor's rotor. The valve includes a valve member and valve seat disposed within a fluid conduit, and the spring is disposed between the actuator and the valve.

16 Claims, 2 Drawing Sheets

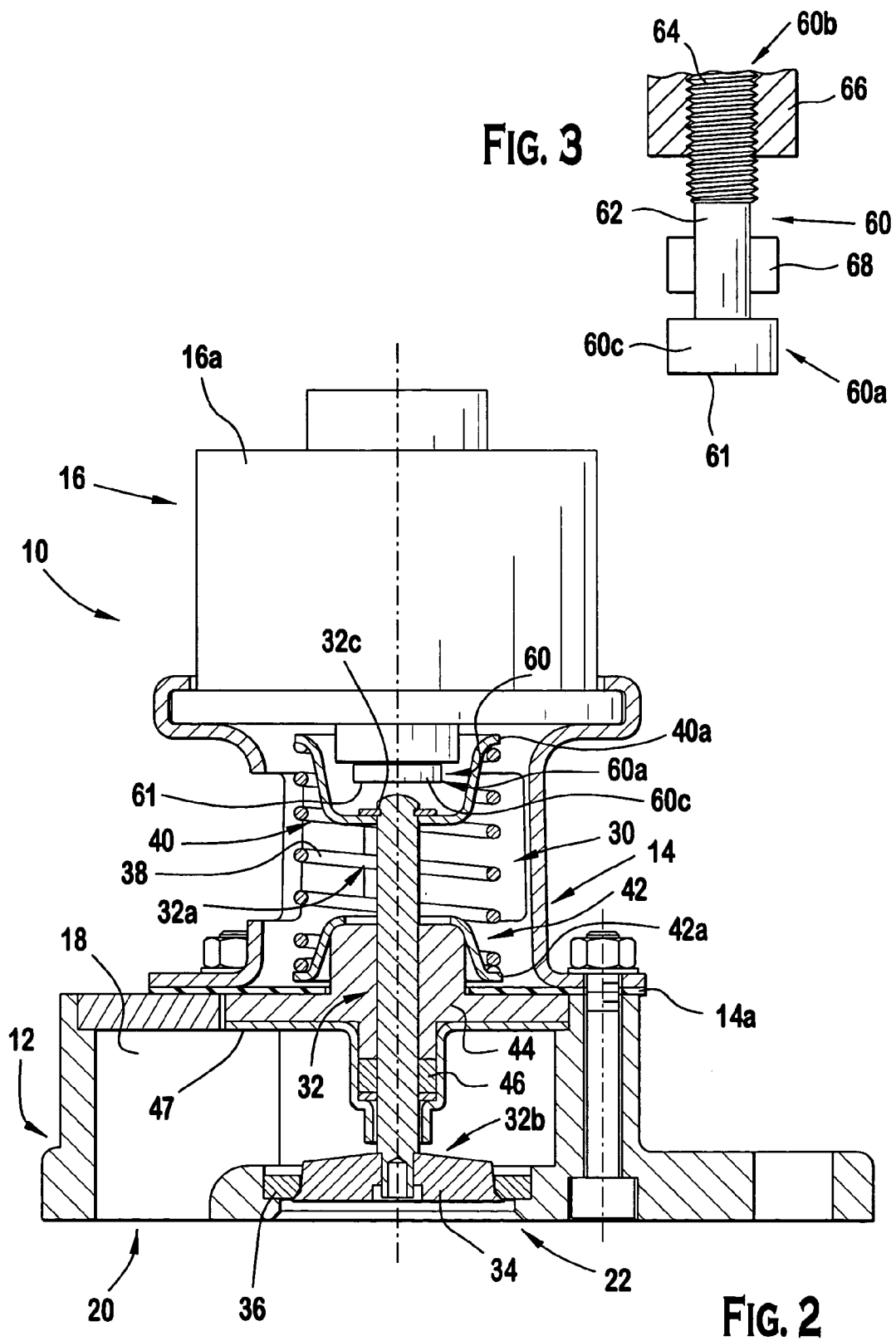

EXHAUST GAS RECIRCULATION VALVE HAVING A ROTARY MOTOR

PRIORITY

This application claims the benefits of U.S. Provisional Application Ser. No. 60/440,857 entitled "*Synchronous Motor Exhaust Gas Recirculation Valve*" by Gary Everingham and Kirk Ivens and filed on Jan. 17, 2003, which provisional application is hereby incorporated by reference in its entirety. U.S. application having ("Exhaust Gas Recirculation Valve Having a Rotary Motor") filed on the same day as this application, and is hereby incorporated by reference in its entirety.

BACKGROUND OF THE INVENTION

Controlled engine exhaust gas recirculation ("EGR") is a known technique for reducing oxides of nitrogen in products of combustion that are exhausted from an internal combustion engine to atmosphere. A known EGR system employs an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

It is known to mount an EGR valve on an engine manifold where the valve is subjected to a harsh operating environment that includes wide temperature extremes and vibrations. Stringent demands are imposed by governmental regulation of exhaust emissions that have created a need for improved control of such valves. Use of an electric actuator is one means for obtaining improved control, but in order to be commercially successful, such an actuator must be able to operate properly in such extreme environments for an extended period of usage. Moreover, in mass-production automotive vehicle applications, component cost-effectiveness and size may be significant considerations.

A known EGR valve typically relies on a valve that is actuated by a movement of a valve stem by an electromagnetic actuator. The EGR valve is typically mounted to a manifold or a housing that has one port exposed to exhaust gases and another port exposed to an intake manifold of the engine. Under certain operating conditions, the valve abuts a valve seat surface so as to prevent exhaust gases from flowing into the intake manifold. Depending on the operating conditions, the valve can be moved away from the seat to permit a controlled amount of exhaust gases into the intake manifold.

An EGR valve having a linear actuator including a rotary motor, which possesses more accurate, quicker and generally linear responses can be advantageous by providing improved control of tailpipe emissions, improved driveability, and/or improved fuel economy for a vehicle having an internal combustion engine that is equipped with an EGR system.

Further, an EGR valve having a linear actuator including a rotary motor, which is more compact in size while delivering the same or an increased magnitude of force over the travel of the valve stroke can be advantageous because of limitations on available space in a vehicle engine compartment. Thus, it would be advantageous to provide for an EGR valve that is compact yet powerful enough to deliver a generally constant force over an extended stroke distance.

SUMMARY OF THE INVENTION

In one preferred embodiment, a method for assembling an exhaust gas recirculation (EGR) valve is provided. This method includes providing a base having a fluid conduit extending between first and second ports, a valve member disposed within the fluid conduit, and a valve shaft having a first end fixed to the valve member and a second end, and mounting a linear actuator with a rotary motor to the base, the actuator including a displaceable member that is decoupled from the valve shaft.

In another embodiment, a method of operating an exhaust gas recirculation valve is provided including the steps of providing a valve portion including a valve member engaged with a valve seat when the valve portion is in a closed position, a valve stem having a longitudinal axis, a first end secured to the valve member and a second end, and a spring that biases the valve member into engagement with the valve seat. This method also includes the steps of providing a linear actuator including a rotary motor and a displaceable member coupled to the motor's rotor, wherein the rotation axis of the rotor is substantially parallel to the longitudinal axis, and opening the valve including pushing the displaceable member into the valve stem second end.

In a method for closing an EGR valve, there includes the steps of providing a linear actuator having a rotary motor, providing a base, a valve member disposed within the base and being engaged with a valve seat when the valve is closed and the valve member being linear displaced from the valve seat when configured from the closed to an open position, providing a spring disposed below the actuator wherein the spring is compressed when the valve is open and upon power loss to the motor, closing the valve including expanding the compressed spring.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain the features of the invention.

FIG. 2 is a cross-sectional view of the EGR valve of FIG. 1 configured in a closed position.

FIG. 3 illustrates a portion of an actuator of the EGR valve of FIGS. 1 and 2 including a lead screw and a nut.

DETAILED DESCRIPTION OF THE PREFERRED EMBODIMENT(S)

Figure 1:
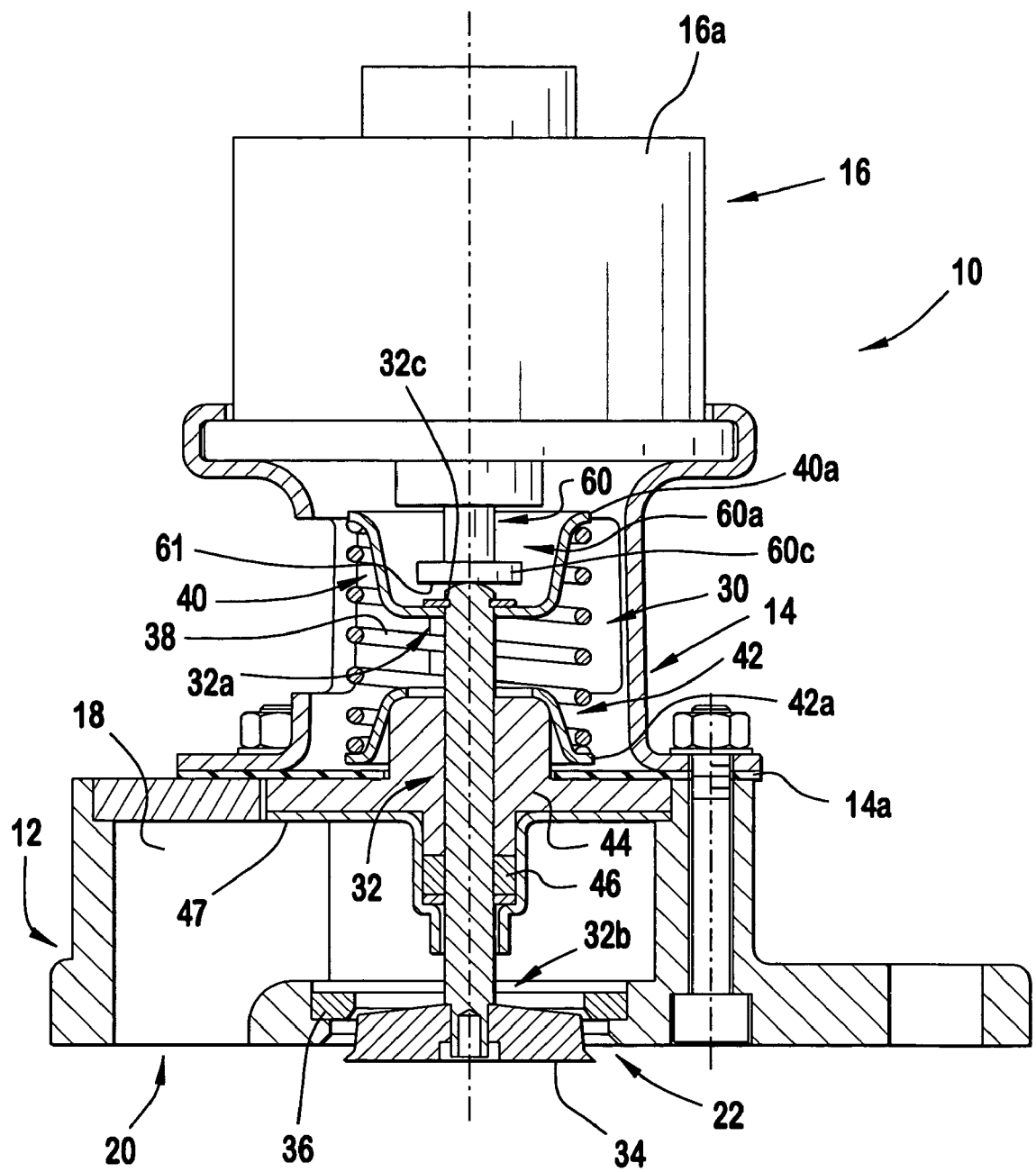
FIG. 1 is a cross-sectional view of an EGR valve configured in an open position.

FIGS. 1 and 2 illustrate cross-sectional views of an embodiment of an exhaust gas recirculation EGR valve 10 according to a preferred embodiment. EGR valve 10 includes a base 12, bracket 14 and a valve actuator 16. Actuator 16 includes any suitable rotary motor (e.g., stepper, synchronous, DC) and a shaft 60 coupled to the motor's rotor. Preferably, a DC motor is used, and more preferably, a brushless DC motor is used. Actuator 16 may be used to configure valve 10 among a plurality of open positions and a closed position on command from an engine control unit (ECU). FIG. 2 illustrates a closed position and FIG. 1 illustrates one such open position. Shaft 60 is linearly displaced by the motor for purposes of applying a force to a valve stem 32 through surface contact with stem 32. This applied force causes a valve member 34 to extend downward, disengaging valve member 34 from valve seat 36 and thereby configuring valve 10 in an open position (e.g., as shown in FIG. 2). A compression spring 38 is preferably coupled to stem 32 to bias valve member 34 into engagement with valve seat 36.

Valve seat 36 and valve member 34 are located within a fluid conduit 18 formed by base 12. Base 12 provides a platform for mounting valve stem 32, spring 38 and bracket 14 of valve 10, in addition to its role in providing a fluid path for engine exhaust. Specifically, base 12 forms a fluid conduit 18 extending between a first port 20 and a second port 22. One of ports 20, 22 may be in fluid communication with an engine intake or exhaust manifold. For example, port 22 may face an intake manifold while port 20 faces a return exhaust passageway from the engine.

A valve portion 30 of valve 10 includes stem 32, spring 38, valve member 34 and valve seat 36. Stem 32, having a first and second end 32a and 32b, respectively, is connected to valve member 34 at end 32b. End 32a is preferably formed with a curved surface and includes a notched portion 32c for securing a cup 40 thereto. Cup 40 preferably takes the shape of a frustoconical-like element having a flange portion 40a. Valve seat 36 and valve member 34 are made from a material suitably chosen to withstand high temperature loading conditions associated with an EGR environment.

Valve member 34 and valve seat 36 form a pintle-type valve. Other valve types may alternatively be used in place of a pintle-type valve, e.g., a poppet valve. Valve member 34 is upwardly tapered, and seat 36 is correspondingly shaped to receive valve member 34 to establish a fluid-tight seal. When valve 10 is configured in an open position, valve member 34 is disposed below seat 36, as can be understand by comparing FIG. 1 with FIG. 2. Valve stem 32 slides within a bearing element 44 that is retained between a cup 42, gasket 14a, base 12 and a pin protector 47. At one end bearing 44 abuts a stem seal 46 and at the other end cup 42. Seal 46, which is preferably made from a high temperature graphite, is included in valve 10 to prevent exhaust gases from leaking past valve stem 32.

In a preferred embodiment, a spring, and more preferably, a linear spring 38 is used to bias valve member 34 into engagement with seat 36. Spring 38 is retained between annular flange 40a and flange 42a of cups 40 and 42, respectively. The distance between flanges 42a and 40a, and/or a spring stiffness is chosen so that a sufficient pre-load is applied to retain valve 10 in a closed position using a pre-load in spring 38. Spring 38 is preferably a compression spring. As valve 10 is configured from a closed position to open position by applying a downward force on stem 32, spring 38 is compressed between flanges 40a and 42a.

In the embodiment of valve 10 illustrated in FIGS. 1 and 2, valve portion 30, which generally refers to spring 38, cups 40, 42, stem 32 and valve member 34 may be decoupled from shaft 60 of actuator 16. In other words, shaft 60 may be spaced from stem 32 (e.g., FIG. 2) so that only spring 38 influences the motion of valve member 34. This decoupled end 32a is preferably formed with a curved surface and when abutted with actuator 16, this curved surface makes surface contact with a preferably flat face 61 of shaft 60.

Decoupled shaft 60 and stem 32 allows for assembly without having to maintain a precise alignment between two or more components on an assembly line and will also tolerate slight misalignments between the motor and shaft 60. A disc-shaped body 60c disposed at end 60a of shaft 60 can be included with shaft 60 so as to provide a relatively large contact area for stem 32 in the event of slight misalignments during assembly. Decoupled shaft 60 also minimizes tolerance stack up problems from the valve 10 components.

Decoupled shaft 60 and stem 32 will also facilitate a certain degree of tolerance for misalignments that may occur during valve operations. For example, if the line of action of shaft 60 "shifts" over time such that the force applied to stem 32 by shaft 60 is no longer co-linear with the longitudinal axis of stem 32, shaft 60 may still be capable of displacing valve member 34 from seat 36 without imposing undue stress on actuator 16 bearings. A misalignment, or "shift" between the line of action of shaft 60 and the stem 32 longitudinal axis may result from, e.g., repeated external mechanical vibrations that tend to loosen fittings between valve 10 components. Bearing 44, which guides stem 32, may be sized to allow a certain degree of "play" between stem 32 and bearing 44.

It is advantageous to minimize the amount of heat transfer from regions of valve 10 in close proximity to exhaust gas to actuator 16 because high actuator 16 temperatures can adversely effect the performance of valve 10. Accordingly, a preferred embodiment of an EGR valve, valve 10, includes an arrangement of components that attempts to minimize the amount of heat that is transferred from base 12 and/or stem 32 to actuator 16. Stem 32 and shaft 60, when they make contact, do so over a relatively small surface area. Additionally, bracket 14 is provided with openings or cut-outs to allow air to come into contact with stem 32 and reduce the amount of heat transfer to actuator 16. An insulating coramic gasket 14a, for example, is disposed between bracket 14 and base 12, which also reduces the amount of heat transfer from base 12 to bracket 14. Cups 40 and 42 may also be configured to dissipate heat by forming flanges 40a, 42a as heat dissipating fins and cup 42 may be used as a heat isolator from bearing 44.

As mentioned earlier, actuator 16 includes a rotary motor and a mechanism that is capable of displacing shaft 60 towards or away from stem 32. Specifically, actuator 16 includes a mechanism that converts rotary motion of the motor's rotor to linear motion in shaft 60. FIG. 3 illustrate a preferred embodiment of this rotary to linear motion device. In this embodiment, shaft 60 includes a lead screw 62 having a threading 64 formed at end 60b that is engaged with a threaded nut 66 that is coupled in rotation to the motor's rotor. Lead screw 62 may include a pair of flanges 68 that are received in stationary slots or channels (not shown) within actuator casing 16a to prevent rotation of shaft 60 relative to nut 66. Thus, when a torque is applied to lead screw 62 through nut 66, shaft 60 is linearly displaced as a result of the threaded engagement with nut 66. Any suitable rotary motor having the desired torque, speed and power characteristics may be used with valve and its selection depends on the specific application.

In general, the factors that may be considered when selecting the appropriate actuator for valve operations include: ambient temperature (measured at the application site); self heat rise of the motor (measured at application site with embedded thermocouples); gross linear force (e.g., poppet valve area×pressure+motor friction+pin friction× 1.5); diameter of the pintle; fail safe efficiency (e.g., (Torque×2 PI)/(axial force×lead screw length)=fail safe efficiency) and return spring force (as discussed in greater detail below); and the desired response to open and close the valve. Additionally, motor parameters (e.g., as provided by a motor supplier) such as resolution per revolution (a function of the number of poles); detent torque; net force deference between gross and needed or actual force; coefficient of friction of lead screw torque; and coefficient of friction of shaft seal torque may be relevant to the motor selection for a particular application.

Actuator 10 includes a failsafe capability, as alluded to above. In one embodiment, valve 10 includes a failsafe return spring, e.g., spring 38. In the event of a loss of power to the motor, spring 38 is designed to effectively return the valve to the closed position, which in the preferred embodiments requires that the spring be capable of backdriving the actuator. In this regard, the thread pitch should be suitably chosen so that it can be backdriven by the spring. Any of a variety of actuators are believed to include a thread pitch that can meet the requirements for failsafe operations. Thus, the selection of a specific actuator will generally vary from application to application. In selecting a spring for a failsafe operation, the following calculation may be performed to determine whether the valve will remain closed (i.e., whether the spring pre-load is acceptable) when the valve is subjected to, e.g., a quasi-static 13G load of the valve for the following sample masses of component parts of a pintle-type valve embodiment:

$$(\text{Mass of Pintle Assembly} + 1/2 \text{ Spring Mass} +$$
$$\text{Mass of Upper Spring Cup}) * Gload \leq \text{Spring Preload}$$
$$\left((21.45 \text{ grams} + 0.5(6 \text{ grams}) + 7.56 \text{ grams}) * \frac{1 \text{ kg}}{1000 \text{ grams}}\right) *$$
$$\left(13G * \frac{9.81 \text{ m/s}^2}{1G}\right) \leq 25N$$
$$4.09 \frac{\text{kg m}}{\text{s}^2} = 4.09 N \leq 25N$$

*Typical EGR Gload of 13G was used for this calculation

In the illustrated embodiment, stem 32, valve member 34, cup 40, one half the mass of spring 38, and associated fasteners would represent the mass in the above calculation.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of assembling an exhaust gas recirculation valve, comprising the steps of
   providing a base having a fluid conduit extending between first and second ports, a valve member disposed within the fluid conduit, and a valve shaft having a first end fixed to the valve member and a second end defining a longitudinal axis, and a spring extending between first and second cups, the first cup transferring inwardly toward the longitudinal axis a biasing force to the valve shaft, the second cup transferring inwardly toward the longitudinal axis a reaction force of the spring to the base, and the second cup being oriented in a direction opposite the fist cup;
   providing a gasket between the base and the second cup, wherein the second cup is spaced from the gasket; and
   mounting a linear actuator with rotary motor to the base, the actuator including a displaceable member having an end that is decoupled from the valve shaft and wherein the member's end is engaged with the valve shaft when the valve is configured in an open position.

2. The method of claim 1, wherein the mounting step includes disposing the member's end and valve shaft in a spaced relationship.

3. The method of claim 1, further including the step of providing a passageway within the base and receiving the valve shaft within the passageway, the passageway having a first opening facing the actuator and a second opening facing the valve member, locating a bearing within the passageway, positioning the second cup at the first opening.

4. The method of claim 3, wherein the mounting step includes the step of positioning an end of the displaceable member in proximity of the second end of the valve shaft so that the member's end is brought in contact with the shaft second end.

5. The method of claim 4, wherein the providing step further includes forming a curved surface at the shaft second end.

6. The method of claim 5, further including the step of disposing a disc-shaped member at the end of the displaceable member.

7. A method for operating an EGR valve, comprising the steps of:
   providing a base, valve portion disposed within the base including a valve member engaged with a valve seat when the valve portion is in a closed position, a valve stem having a longitudinal axis, a first end secured to the valve member and a second end, and a spring that biases the valve member into engagement with the valve seat, the spring extending between first and second cups, the first cup transferring inwardly toward the longitudinal axis a biasing force to the valve stem, the second cup transferring inwardly toward the longitudinal axis a reaction force of the spring to the base, and the second cup being oriented in a direction opposite the first cup;
   providing a gasket between the base and the second cup, wherein the second cup is spaced from the gasket;
   providing a linear actuator including a rotary motor and a displaceable member coupled to the motor's rotor, wherein the rotation axis of the rotor is substantially parallel to the longitudinal axis; and
   opening the valve including pushing the displaceable member into the valve stem second end.

8. The method of claim 7, wherein the rotation axis is approximately parallel to the longitudinal axis.

9. The method of claim 7, wherein the pushing step includes pushing a disc-shaped member disposed at the end of the displaceable member into a curved shaped surface formed at the valve stem second end.

10. The method of claim 7, wherein the spring is a linear spring.

11. The method of claim 10, further including the step of disposing the spring between the valve member and the actuator.

12. A method of closing an EGR valve, comprising the steps of:
   providing a linear actuator having a rotary motor;
   providing a base, a valve member disposed within the base and being engaged with a valve seat when the valve is closed and the valve member being linear displaced from the valve seat when configured from an closed to open position, a valve stem coupled to the valve member and having a longitudinal axis, and the rotor axis of rotation is substantially parallel to a longitudinal axis;

providing a spring disposed below the actuator wherein the spring is compressed when the valve is open, the spring extending between first and second cups, the first cup transferring inwardly toward the longitudinal axis a biasing force to the valve stem, the second cup transferring inwardly toward the longitudinal axis a reaction force of the spring to the base, and the second cup being oriented in a direction opposite the first cup;

providing a gasket between the base and the second cup, wherein the second cup is spaced from the gasket; and upon power loss to the motor, closing the valve including expanding the compressed spring.

13. The method of claim 12, wherein the providing a linear actuator step includes providing a motor having a constant rotor rate.

14. The method of claim 13, wherein the motor is a synchronous motor.

15. The method of claim 12, wherein the spring is a linear spring.

16. The method of claim 15, further including the step of disposing the spring between the valve member and the actuator.

* * * * *